(12) United States Patent
Ye et al.

(10) Patent No.: US 9,545,171 B2
(45) Date of Patent: Jan. 17, 2017

(54) BEVERAGE PRODUCING EQUIPMENT AND METHOD

(71) Applicant: Teatek Co., Ltd., Putuo District, Shanghai (CN)

(72) Inventors: Yangsheng Ye, Putuo District (CN); Yusheng Shi, Putuo District (CN)

(73) Assignee: TEATEK CO., LTD., Shanghai (CN)

( * ) Notice: Subject to any disclaimer, the term of this patent is extended or adjusted under 35 U.S.C. 154(b) by 125 days.

(21) Appl. No.: 14/602,842

(22) Filed: Jan. 22, 2015

(65) Prior Publication Data
US 2015/0132449 A1    May 14, 2015

Related U.S. Application Data

(62) Division of application No. 13/698,709, filed as application No. PCT/CN2011/074330 on May 19, 2011, now abandoned.

(30) Foreign Application Priority Data

| May 20, 2010 | (CN) | 2010 1 0179507 |
| May 20, 2010 | (CN) | 2010 1 0179518 |
| May 21, 2010 | (CN) | 2010 1 0181098 |
| May 21, 2010 | (CN) | 2010 2 0201394 U |
| May 21, 2010 | (CN) | 2010 2 0201426 U |

(51) Int. Cl.
| *A47J 31/44* | (2006.01) |
| *A47J 31/36* | (2006.01) |
| *B65D 85/804* | (2006.01) |
| *A47J 31/40* | (2006.01) |
| *A47J 31/06* | (2006.01) |
| *A23F 3/18* | (2006.01) |
| *A47J 31/46* | (2006.01) |
| *B65D 81/00* | (2006.01) |

(52) U.S. Cl.
CPC .............. *A47J 31/4492* (2013.01); *A23F 3/18* (2013.01); *A47J 31/0642* (2013.01); *A47J 31/3623* (2013.01); *A47J 31/3638* (2013.01); *A47J 31/407* (2013.01); *A47J 31/46* (2013.01); *B65D 85/8043* (2013.01); *B65D 85/8046* (2013.01); *B65D 2081/007* (2013.01); *B65D 2203/00* (2013.01); *B65D 2203/06* (2013.01)

(58) Field of Classification Search
CPC .................... A47J 31/4492; A47J 31/58; A47J 31/376–31/695; A47J 31/3623–31/3642; A47J 31/407; A23F 3/18; A23F 5/24; B65D 85/8046; B65D 2081/002–2081/007; B65D 2203/03
USPC  426/77–84, 87, 115, 597, 383, 394; 99/295, 99/280–285
See application file for complete search history.

(56) References Cited

U.S. PATENT DOCUMENTS

| 4,579,048 A | * | 4/1986 | Stover ................... A47J 31/002 99/280 |
| 4,867,993 A | | 9/1989 | Nordskog |
| 5,393,548 A | | 2/1995 | Heiligman |
| 5,927,179 A | | 7/1999 | Mordini et al. |

(Continued)

OTHER PUBLICATIONS

Office Action issued Sep. 11, 2014 in Chinese Application No. 201180029672.X, in English only.

*Primary Examiner* — Drew Becker
(74) *Attorney, Agent, or Firm* — Im IP Law; C. Andrew Im (57) ABSTRACT

A beverage producing apparatus and method are provided for producing a beverage, using an identification label of a beverage substance cartridge.

10 Claims, 9 Drawing Sheets

(56) References Cited

U.S. PATENT DOCUMENTS

| | | | |
|---|---|---|---|
| 5,974,950 A | 11/1999 | King | |
| 6,025,000 A | 2/2000 | Fond et al. | |
| 6,155,158 A * | 12/2000 | Anson | A47J 31/007 99/280 |
| 6,517,880 B2 | 2/2003 | Walters, Jr. et al. | |
| 6,645,537 B2 | 11/2003 | Sweeney et al. | |
| 6,849,285 B2 | 2/2005 | Masek et al. | |
| 7,219,599 B2 * | 5/2007 | Geiger | A47J 31/46 99/299 |
| 2002/0048621 A1 * | 4/2002 | Boyd | A47J 31/3623 426/77 |
| 2002/0129712 A1 * | 9/2002 | Westbrook | A47J 31/3676 99/279 |
| 2003/0070554 A1 | 4/2003 | Cortese | |
| 2003/0129286 A1 * | 7/2003 | Knepler | A47J 31/057 426/231 |
| 2004/0180123 A1 | 9/2004 | Halliday et al. | |
| 2004/0197444 A1 | 10/2004 | Halliday et al. | |
| 2004/0237793 A1 * | 12/2004 | Zurcher | A47J 31/3642 99/275 |
| 2005/0150391 A1 * | 7/2005 | Schifferle | A47J 31/0673 99/295 |
| 2007/0144357 A1 | 6/2007 | Rivera | |
| 2007/0203587 A1 * | 8/2007 | Erlandsson | A47J 31/3676 700/11 |
| 2008/0148948 A1 | 6/2008 | Evers et al. | |
| 2009/0155422 A1 | 6/2009 | Ozanne | |
| 2009/0183640 A1 | 7/2009 | Ozanne | |
| 2009/0205747 A1 | 8/2009 | Lillard, Jr. | |
| 2009/0219140 A1 * | 9/2009 | Guard | A47J 31/4492 340/10.1 |
| 2010/0064899 A1 | 3/2010 | Aardenburg | |
| 2010/0078480 A1 * | 4/2010 | Aker | G06K 19/06009 235/462.08 |
| 2010/0166928 A1 | 7/2010 | Stamm et al. | |
| 2010/0282088 A1 | 11/2010 | Deuber et al. | |
| 2011/0041700 A1 | 2/2011 | Epars et al. | |
| 2013/0014648 A1 | 1/2013 | Rognon et al. | |
| 2013/0064929 A1 | 3/2013 | Jarisch et al. | |
| 2013/0129872 A1 | 5/2013 | Kruger | |
| 2013/0206011 A1 | 8/2013 | Ozanne et al. | |
| 2013/0312619 A1 | 11/2013 | Spiegel et al. | |
| 2014/0134299 A1 | 5/2014 | Guidorzi et al. | |
| 2014/0224130 A1 | 8/2014 | Castellani et al. | |

* cited by examiner

| Identification code | Beverage substance | Steeping kind | Water filling temperature | Water filling speed | Steeping time |
|---|---|---|---|---|---|
| A1 | N1 | Tea waking | $T_{11}$ | $V_{11}$ | $t_{11}$ |
| | | Presoaking | $T_{21}$ | $V_{21}$ | $t_{21}$ |
| | | Extracting | $T_{31}$ | $V_{21}$ | $t_{31}$ |
| A2 0X564E779D3 | N2 OolongTea | Tea waking | 120°C | 1:120 | 5s |
| | | Presoaking | 100°C | 7:16 | 15s |
| | | Extracting | 90°C | 12:7 | 35s |
| | | | | | |
| Ai | Ni | Tea waking | $T_{1i}$ | $V_{1i}$ | $t_{1i}$ |
| | | Presoaking | $T_{2i}$ | $V_{2i}$ | $t_{2i}$ |
| | | Extracting | $T_{3i}$ | $V_{3i}$ | $t_{3i}$ |
| | | | | | |
| An | Nn | Tea waking | $T_{1n}$ | $V_{1n}$ | $t_{1n}$ |
| | | Presoaking | $T_{2n}$ | $V_{2n}$ | $t_{2n}$ |
| | | Extracting | $T_{3n}$ | $V_{3n}$ | $t_{3n}$ |

BEVERAGE PRODUCING EQUIPMENT AND METHOD

CROSS-REFERENCE TO RELATED APPLICATIONS

This application is a divisional of U.S. patent application Ser. No. 13/698,709 filed Feb. 5, 2013, now abandoned, which, in turn, is a Section 371 of International Application No. PCT/CN2011/074330, filed May 19, 2011, which was published in the Chinese language on Nov. 24, 2011, under International Publication No. WO 2011/144040 A1. The disclosures of each of the above-identified applications are incorporated herein by reference.

BACKGROUND OF THE INVENTION

Field of the Invention

The invention relates to a beverage producing field, specially a beverage substance cartridge, an identifying apparatus, a beverage producing equipment, a beverage producing system and a beverage producing method.

Related Background Art

Drinking tea and tasting tea is a long-lasting tradition in China. People drinking tea frequently could not only cultivate their taste, but also prolong their life. Especially there are over 100 tea leaf varieties in China, every variety has its unique characteristics, and different brewing methods are for different tea leaf varieties to exert different advantages of every variety during brewing. For example, there are different requirements for water temperatures, brewing times and time.

Meanwhile, traditional tea drinking way is to put tea leaves directly into a tea pot which is then filled with hot water for brewing and then drink tea, but the inconvenience is that all the process is handled and controlled manually, and this could be realized by people with pretty much spare time or professional tea tasters, while it is too time-consuming for people at offices who want to drink tea, and furthermore it is difficult for amateurs to brew tea to the perfect taste.

Therefore, in order to be convenient for automatic tea brewing, a very simple automatic tea brewing equipment with a single function is designed (for example, refer to the Chinese invention patent with patent application number 200410041385.2). However, tea leaves of different varieties have different requirements for brewing water temperatures, lasting time of each step and repeated brewing times, and if the same water temperature and flow are applied to brew tea leaves of different varieties, the tea's aroma, taste and nutrients cannot be perfect and the biggest advantages of tea leaves cannot be given into full play. Moreover, the singular tea brewing way for some tea leaves may be harmful to human. Besides, there are many kinds of beverage substances to be brewed into drinks, and different beverage substances have different requirements for water temperatures and water filling speeds in the brewing process, while the automatic tea brewing equipment of present technology is only able to brew tea leaves in a singular method and cannot brew other beverage.

SUMMARY OF THE INVENTION

It is, therefore, an object of the invention to provide a beverage substance cartridge, an identifying apparatus, a beverage producing equipment, a beverage producing system and a beverage producing method to solve the technical problem that the tea brewing equipment of present technology can only use one singular method to brew tea leaves of different varieties and brewed tea's aroma, taste and nutrients cannot be perfect. Furthermore, the invention also solves the technical problem that the present tea brewing equipment can only brew tea but not other beverage.

In order to realize the above mentioned objects, the invention has adopted the following technical plan:

There is provided a beverage substance cartridge comprising a cartridge body to accommodate substance for beverage production, a sealing cover to seal the substance in the cartridge body and also an identification label, Further the identification label is set on the sealing cover;

Further the identification label is set on external surface of the cartridge body;

Further the identification label is any one of digital code, image code, bar code and radio frequency code; or a combination of at least two of digital code, image code, bar code and radio frequency code;

Further the substance is any one of tea, dried vegetable, dried fruit and Chinese medicinal herb or a combination of at least two of tea, dried vegetable, dried fruit and Chinese medicinal herb;

Further the substance is any one of coffee, milk tea and tang or a combination of at least two of coffee, milk tea and tang.

There is provided an identifying apparatus to identify the substance in the beverage substance cartridge comprising:

An obtaining and identifying section to obtain the identification label on the beverage substance cartridge and identify an identification code to correspond to the identification label;

A parameter storing section to store at least one brewing parameter to correspond to the identification label of various substances to brew the substance when producing beverage;

A retrieving and judging section to retrieve the parameter storing section and judge the brewing parameters to correspond to the identification label according to the identification label obtained by the obtaining and identifying section.

Further, the brewing parameters include a water filling temperature, a water filling speed and steeping time.

Further the substance is tea leaf, a brewing process includes three steps namely tea waking, presoaking and steeping, and the water filling temperature, the water filling speed and the steeping time are set and used in every step.

Further, the obtaining and identifying section is any one of a bar code identifying section, an image identifying section and a radio frequency identifying section; or a combination of at least two of a bar code identifying section, an image identifying section and a radio frequency identifying section.

Further, the bar code identifying section is a bar code recognizer, and the pattern identifying section is a camera.

There is provided a beverage producing comprising:

A beverage substance cartridge putting section to put the beverage substance cartridge;

A water supplying section to supply water for beverage production;

A brewing apparatus to brew the raw substance into beverage;

A water exporting section to export the beverage;

And further comprising:

An identifying apparatus for identifying the substance contained in the beverage substance cartridge.

The identifying apparatus has:
An obtaining and identifying section to obtain and identify the identification label on the beverage substance cartridge;
A parameter storing section to store brewing parameters to correspond to the identification label of various the beverage substance to brew the substance when producing beverage;
A retrieving and judging section to retrieve the parameter storing section and judge the brewing parameters to correspond to the identification label according to the identification label obtained by the obtaining and identifying section;
Wherein the brewing section brews the substance, it is according to the brewing parameters.
Further, the beverage producing equipment also includes a controlling section which sends commands to the beverage substance cartridge putting section, the identifying apparatus, the brewing apparatus and the water exporting section.
Further the brewing apparatus has a heating section to heat water supplied by the water supplying section, a water filling section to fill heated water to the beverage substance cartridge and a steeping section to steep juice of the substance;
The brewing parameters include the water filling temperature, the water filling speed and the steeping time;
The heating section heats water according to the water filling temperature;
The water filling section fills water to the beverage substance cartridge according to the water filling speed;
The steeping section steeps juice of the substance within the steeping time.
Further the substance is tea leaf, the steeping kinds of the tea leaf include three kinds namely tea waking, pre-soaking and extracting, and the water filling temperature, the water filling speed and the steeping time are set and adopted in every steeping process respectively.
Further the identification label also includes beverage substance information indicating property of substance, and the identifying apparatus also includes a fine tuning data storing section to store substance information indicating property of beverage substance and fine tuning parameters to correspond to the substance information. The beverage substance information is any one of place of origin and production date of beverage substance or the two of place of origin and production date of beverage substance.
There is provided a beverage producing system including the beverage producing equipment and the beverage substance cartridge.
A beverage producing method for producing beverage by using the beverage producing system includes the following steps:
1) Adopting an obtaining and identifying apparatus in an identifying apparatus to obtain identification label on a beverage substance cartridge;
2) Adopting a retrieving and judging section in the identifying apparatus to judge brewing parameters according to the identification label obtained;
3) Adopting a brewing apparatus to brew substance in the beverage substance cartridge according to the brewing parameters judged;
4) Adopting a water exporting section to export brewed beverage in brewing process.

Further, the substance cartridge collecting section is used to collect a used beverage substance cartridge after beverage is exported.
Further the brewing parameters include a water filling temperature, a water filling speed and steeping time, and the brewing apparatus includes a heating section, a water filling section and a steeping section;
Wherein the heating section is used to heat water according to the water filling temperature;
The water filling section is used to fill water into the beverage substance cartridge according to the water filling speed;
The steeping section is used to complete the substance steeping process according to the steeping time.
Thanks to technical features above, the invention, compared with present technology, has the following advantages and positive effects:
The invention provides the beverage substance cartridge, the identifying apparatus, the beverage producing equipment, the beverage producing system and the beverage producing method, and it could supply water automatically instead of manual work, identify information about beverage substance likewise, such as variety and years of tea leaf, and furthermore, take different brewing methods targeting at different beverage substances (e.g. tea leaf) according to identified information in collaboration with pre-stored beverage brewing parameters to make sure every beverage substance could be brewed according to a perfect method, so the advantage of beverage substance will be given into full play. The beverage producing equipment which adopts the invention could yield brewing results accomplished by specialists, and furthermore, it could be widely applied in offices and homes.

DETAILED DESCRIPTION OF THE PREFERRED EMBODIMENTS

Embodiments of a beverage substance cartridge, an identifying apparatus, a beverage producing equipment, a beverage producing system and a beverage producing method in the invention will be described in details herein below with reference to the drawings. However, the invention is not only limited to the embodiments. Specific details are given in the following preferred embodiments of the invention to give the public a thorough understanding about the invention.

Embodiment 1

Figure 1:
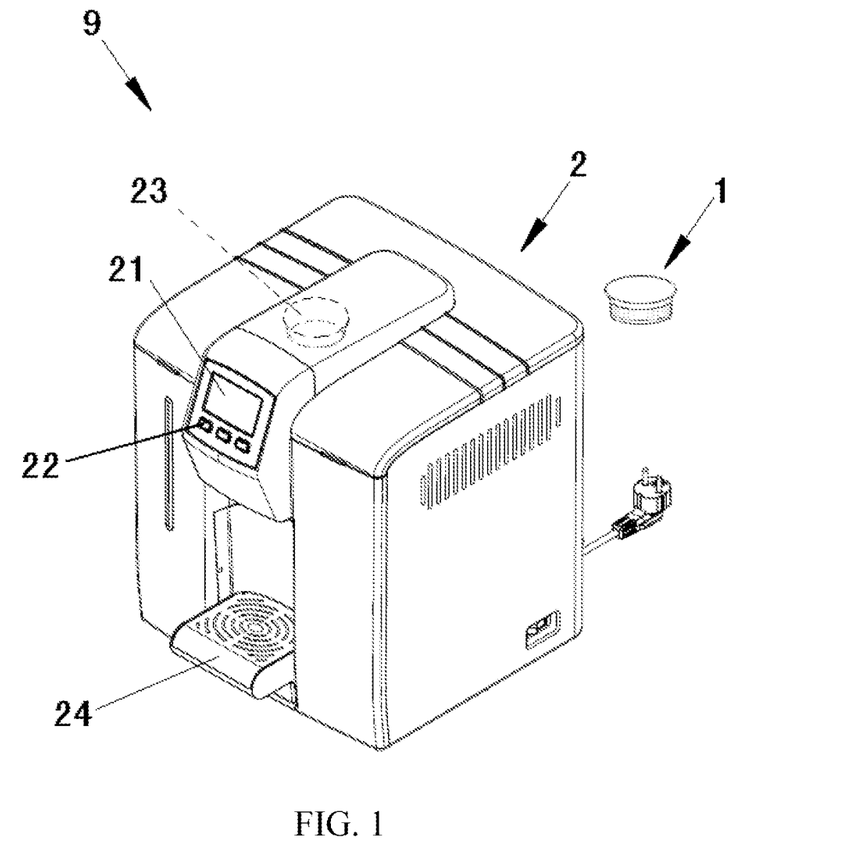
FIG. 1 is a summary structure drawing of a beverage producing system in embodiment 1.

As shown by FIG. 1, a beverage producing system 9 includes a beverage substance cartridge 1 and a beverage producing equipment 2 to be used in conjunction.

The beverage producing equipment 2 has a display screen 21 and a keypad 22.

The beverage producing equipment 2 has a cavity 23 with the same size and shape of the beverage substance cartridge 1 to put the beverage substance cartridge 1.

The beverage producing equipment 2 has a supporting platform 24, which is detachable to put the cup.

One set of beverage producing equipment 2 could be used in conjunction with different beverage substance cartridges 1. The user only needs to select a beverage substance cartridge 1, put it into the cavity 23 of the beverage producing equipment 2, operate the equipment according to prompts on the display screen 21, and then gets the brewed drink in a minute.

Figure 2:
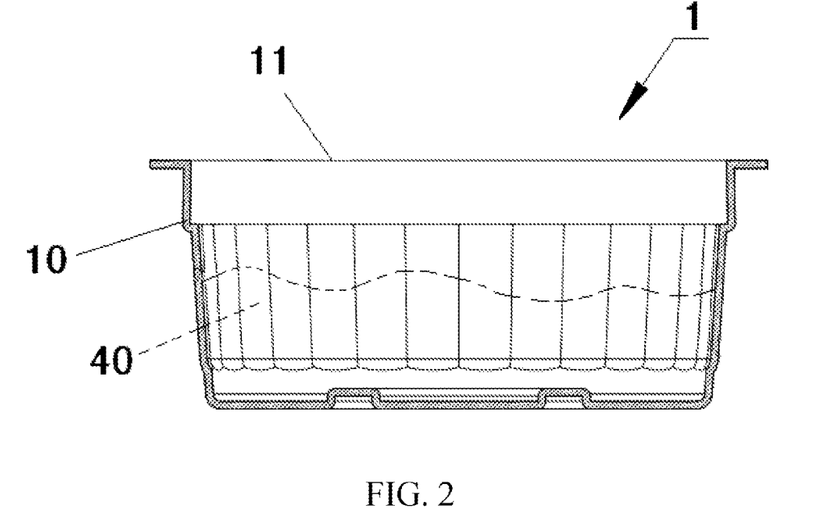
FIG. 2 is a summary structure drawing of a beverage substance cartridge in embodiment 1.

As shown by FIG. 2, the beverage substance cartridge 1 includes a cartridge body 10 and a sealing cover 11.

The cartridge body 10 is used to accommodate substance 40 for beverage production.

The sealing cover 11 is used to seal the substance 40 within the cartridge body 10.

The sealing cover 11 has the sealing film of more than two layers made of different substances. The preferred plan is as follows: the sealing cover is comprised of three layers of sealing film, which from inner cartridge body to outer cartridge body are inner layer sealing film, middle-layer sealing film and outer layer sealing film respectively. The inner layer sealing film is made of PP substance, which is the same with that of the cartridge body. After accommodating beverage substance, the cartridge body 10 is sealed rapidly with hot-melt technology; the middle layer sealing film is made of producing equipment foil substance, which ensures certain strengths and durability against damage of the sealing seal; the outer layer sealing film is made of PET substance to make the sealing cover have a good appearance, and the outer sealing film 113 is directly printed with an identification label to identify beverage. The sealing cover 11 is the sealing film made of at least two layers of different substances, and it is a multi-layer co-extrusion film with certain flexibility. After it is pierced, the sealing cover 11 will have micro deformation to strengthen sealing effects.

The side wall of the cartridge body 10 is integrated of plural arc sections, an internal convex edge is formed where two adjacent arc sections are jointed, and hence the side wall will have many rolling edges. Water will form vortex when water contacts the edge of the cartridge body 10, promote the contact between water and tea leaf, and improve extraction efficiency.

The cartridge body 10 could be pierced by a needle-shaped piercing point of water injecting apparatus and also bear pressure formed on the side wall of the cartridge body when vortex is flowing in the cartridge body. Convex or sunk circular rings are at the bottom of the cartridge body 10 to make the cartridge body more solid to bear pressure formed at the bottom of cartridge body 10 when vortex is flowing in the cartridge body 10.

In the embodiment, the diameter of the bottom surface of the cartridge body 10 is 38 mm, the diameter of the sealing cover 11 is 50 mm, the inner diameter of the circular ring at the bottom of the cartridge body 10 is 12 mm, the outer circle's diameter is 20 mm, the circular ring 13 at the bottom of the cartridge body 10 is raised upwards, the distance between two adjacent edges is 5 mm, and the arched convex between two adjacent edges is 1.2 mm thick.

Figure 3:
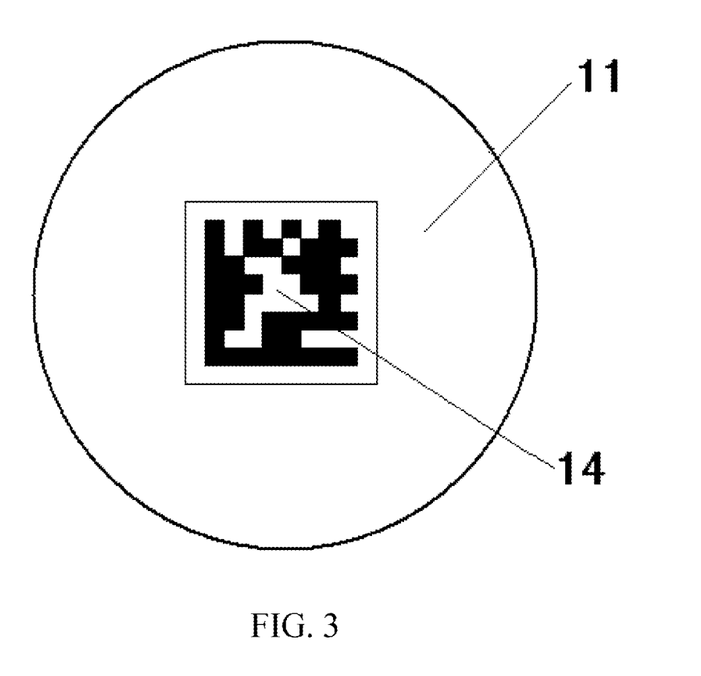
FIG. 3 is an illustration drawing of an identification label on a beverage substance cartridge in embodiment 1.

As shown by FIG. 3, an identification label 14 is printed on the upper surface on the sealing cover 11 of the beverage substance cartridge 1.

The identification code to correspond to the identification label 14 records information related to the beverage substance 40 accommodated in the cartridge body 10, for example, variety. Relevant information will be displayed in the display screen 21 after the identification label 14 is read.

Figure 5:
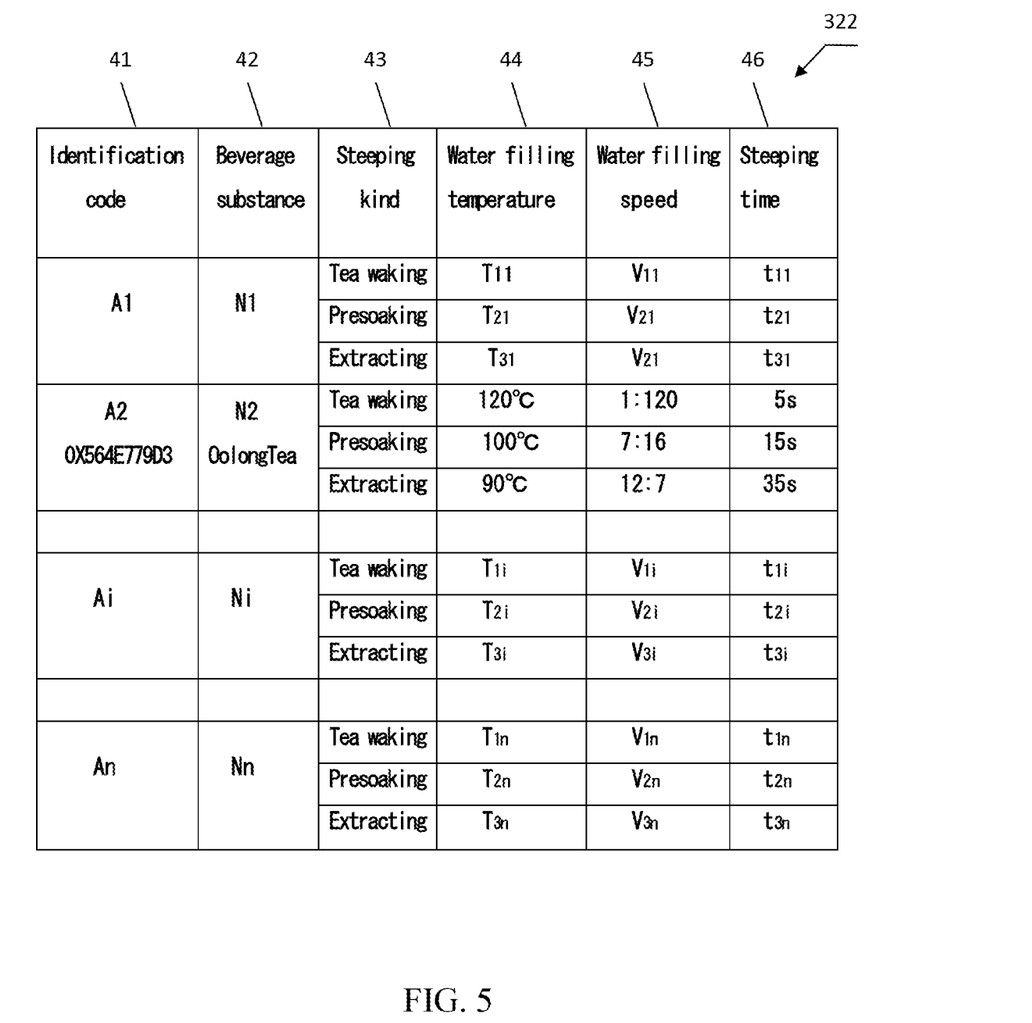
FIG. 5 is an explanation drawing showing a parameter storing section in embodiment 1.

The identification label 14 in FIG. 3 is a pattern identification code which is defined as $A_2$ (See FIG. 5 for details).

In FIG. 5, A, represents an identification code, and $N_i$ represents a beverage substance, (i=1, 2, ..., n). According to the figure, the beverage substance ($N_2$) corresponding to the pattern identification code ($A_2$) is WuyiOolong Tea.

Figure 4:
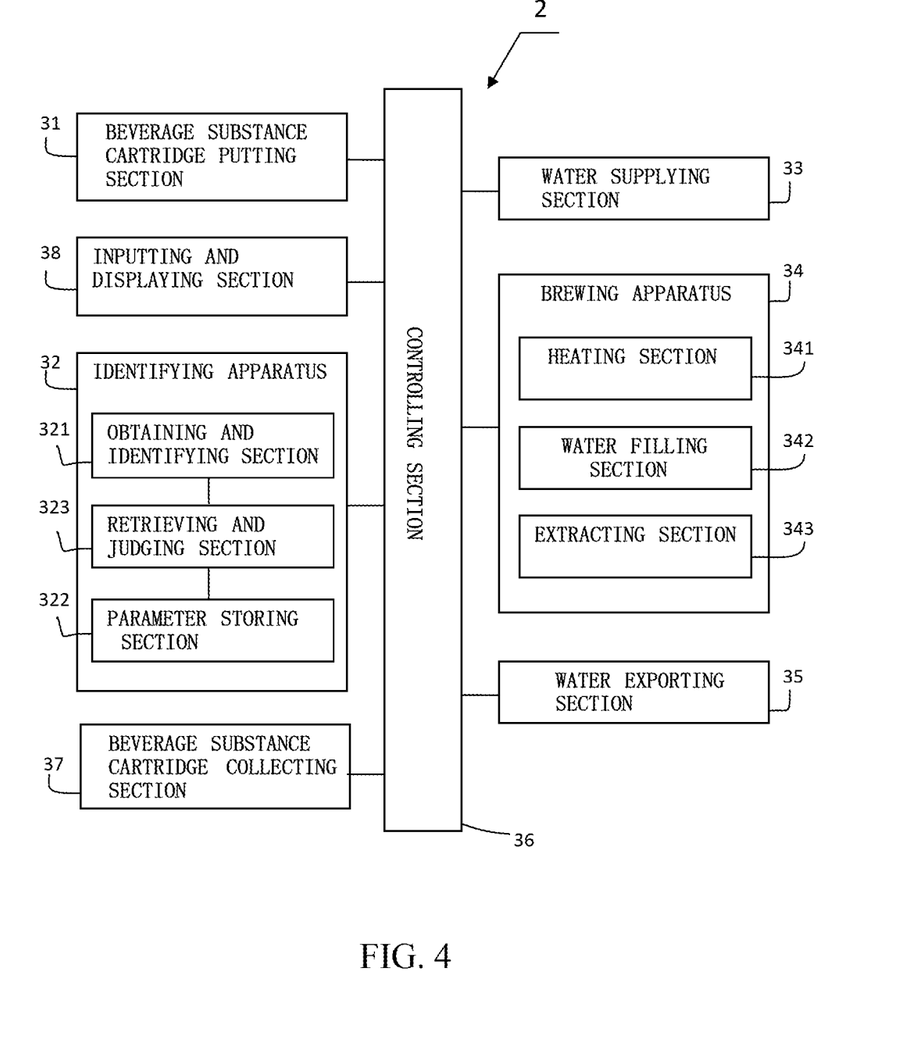
FIG. 4 is a structural block drawing of a beverage substance cartridge in embodiment 1.

As shown by FIG. 4, the beverage producing equipment 2 includes a beverage substance cartridge putting section 31, an inputting and displaying section 38, an identifying apparatus 32, a water supplying section 33, a brewing apparatus 34, a water exporting section 35, a controlling section 36 and a beverage substance cartridge collecting section 37.

The beverage substance cartridge putting section 31 is used to put the beverage substance cartridge 1 and includes the cavity 23 shown in FIG. 1. The size and shape of the cavity 23 is the same with those of the beverage substance cartridge 1.

The inputting and displaying section 38 is used to display working information of the beverage producing equipment 2, beverage substance 40 information, and also used to input control commands, and it also includes the display screen 21 and the keypad 22 shown in FIG. 1.

The display screen 21 displays working status information of the beverage producing equipment 2 and also relevant knowledge about various beverage substances 40 (such as tea leaf).

The keypad 22 is set with corresponding keys and used to selectively control work of the beverage producing equipment 2, for example, consulting relevant beverage information or selectively outputting commands.

The water supplying section 33 is used to supply water for beverage production. The water supplying section 33 includes a water tank and a water pump. The water tank is used to store clear water. The water tank is detachable and has a cover. The water tank may be detached from the beverage producing equipment 2 and filled with water, or the water tank cover may be opened for direct water filling into the water tank. Two electromagnetic valves are used to control water drainage from the water tank, the two of which are used to control beverage brewing and clear water drainage respectively. A liquid level sensor is set inside of the water tank and used to monitor the water level in the water tank to make sure the water in water tank is enough to brew a cup of beverage and prevent failure of completing the brewing process resulted from inadequate water, then unqualified beverage, or a waste of beverage substance. The controlling pump is used to control water supplying speed, which is generally indicated by a break-make ratio.

The identifying apparatus 32 is used to identify the substance 40 in the beverage substance cartridge 1. The identifying apparatus 32 has an obtaining and identifying section 321, a parameter storing section 322 and a retrieving and judging section 323.

The obtaining and identifying section 321 is used to obtain the identification label 14 on the beverage substance cartridge and identify the identification code ($A_2$) corresponding to the identification label 14.

The pattern identifying section to obtain the identification label 14 is an image pick-up apparatus such as a camera. The obtaining and identifying section 321 translates the identification label 14 obtained into identification code $A_2$ for the equipment to read.

The obtaining and identifying section 321 has a cache inside (not shown in the figure) which is used to save the identification code $A_2$ and prepare for comparison of the identification code next.

The identification label 14 is translated into hexadecimal 0X564E779D3 by the obtaining and identifying section 321, i.e. the identification code ($A_2$), representing WuyiOolong Tea ($N_2$) is put in the cartridge body 10 (As shown by FIG. 5).

The parameter storing section 322 is used to store brewing parameters.

As shown by FIG. 5, brewing parameter data of different beverage substances is saved in a table in the parameter storing section 322, for example water filling temperatures, water filling speeds, steeping time, etc. of different tea leaves, also including the most appropriate water temperature, brewing time(s), brewing time, tea waking or not, etc.

The parameter storing section 322 has items including the identification label 41, beverage substance 42, a steeping kind 43, a water filling temperature 44, a water filling speed 45, steeping time 46, etc. To correspond to the items above, different data corresponding to different beverage substances is saved in the parameter storing section 322.

The substance in the embodiment is tea leaf, the brewing process of tea leaf includes three steps namely tea waking, presoaking and extracting, and the water filling temperature, water filling speed and steeping time are set and adopted in every step. Therefore the steeping kind has three items namely tea waking, presoaking and extracting. The tea waking, presoaking and extracting correspond to a group of parameters respectively. The group of parameters includes temperature parameter data $T_{ki}$, speed parameter data $V_{ki}$, time parameter data $t_{ki}$, etc. (wherein, K=1, 2, 3, indicating three processes namely tea waking, presoaking, extracting respectively; i=1, 2, 3 . . . , n, representing the sequence number of the identification code). The water filling speed in the brewing process, i.e. the water filling speed of the water pump, indicates the break-make ratio of the water pump.

As shown by FIG. 4, the retrieving and judging section 323 retrieves the parameter storing section 322 and judges brewing parameters corresponding to the identification label 14 according to the identification label 14 obtained by the obtaining and identifying section 321.

In the embodiment, the identification label 14 is a pattern code and translated into hexadecimal 0X564E779D3($A_2$) by the obtaining and identifying section. As shown by FIG. 5, the substance 40 in the cartridge body 10 is judged as WuyiOolong Tea ($N_2$). Furthermore, the brewing parameters corresponding to the identification label 14 are judged as follows:

When the steeping kind is tea waking, the water filling temperature is 120° C., the water filling speed is 1:120, and the steeping time is 5 s;

When the steeping kind is presoaking, the water filling temperature is 100° C., the water filling speed is 7:16, and the steeping time is 15 s;

When the steeping kind is extracting, the water filling temperature is 90° C., the water filling speed is 12:7, and the steeping time is 35 s.

The brewing apparatus 34 brews the substance 40 according to the brewing parameters judged by the retrieving and judging section 323, and then forms beverage. The brewing apparatus 34 has a heating section 341, a water filling section 342 and a steeping section 343.

The heating section 341 is used to heat water supplied by the water supplying section. The water heating section 341 has a temperature sensor connected with the controlling section 36 to detect real-time temperature of water in the heating section 341 and display temperature data to the display screen 21 through the controlling section 36 for users to understand Teaism knowledge during beverage brewing process.

The heating section 341 has a boiler. The boiler is connected with the water tank 33 of the water supplying section and the water filling section 342 through water pipes with valves respectively. The boiler transports heated water to the steeping section 343 for tea brewing through a two-way valve, or directly transports to the water outlet set above the supporting platform directly, to export boiled water.

The boiler is connected with a power supplying unit and the controlling section 36 through leads respectively, the power supplying unit supplies power to the boiler for water boiling, the controlling unit 36 controls the on or off of the valve of the water pipe, and the valve of the water pipe is a two-way valve.

Generally two types of boilers are selected, i.e. instant boiler and heat-accumulating boiler.

In the case of the instant boiler, the boiler maintains a temperature range $T_a$~$T_b$(generally 90~100) under normal circumstances, i.e. when the temperature is lower than $T_a°$ C., the heater starts to heat; when the temperature increases to $T_b°$ C., the heater stops heating; when the boiler temperature for brewing is determined, the heater will start heating after receiving the command from the controller, and stop heating when the temperature rises to the designated temperature.

In the case of heat-accumulating boiler, the water in the boiler maintains a temperature range $T_a$~$T_b$(generally 70~80) under normal circumstances, i.e. when the temperature is lower than $T_a°$ C., the heater starts to heat; when the temperature increases to $T_b°$ C., the heater stops heating; when the temperature of water for brewing is higher than 90° C., the heater will start heating after receiving the command from the controller, and stops heating when the temperature rises to the designated temperature.

The boiler selected in the embodiment is an instant boiler with curved internal pipes, which could heat cold water rapidly even to water vapor. The temperature sensor connected in the boiler is connected to the controller, which detects the real-time temperature of the boiler for the convenience of choosing the appropriate temperature and further choosing to increase or reduce power.

The water filling section 342 is used to fill heated water to the beverage substance cartridge 1, the water filling speed of the water filling section 342 is the same with the water supplying speed of the water supplying section 33, generally the water supplying speed is represented by the break-make ratio of the water pump in the water supplying section 33, and the water filling speed of the water filling section 342 is the break-make ratio of the water pump in the water supplying section 33 likewise.

The steeping section 343 is used to complete the steeping process of substance 40. The steeping section 343 includes the beverage substance cartridge 1 put in the beverage substance cartridge putting section 31. In the steeping process, the water filling section 342 under the beverage substance cartridge 1 fills water, and a water exporting apparatus or a filtering apparatus is set at the sealing cover 11 of the beverage substance cartridge 1. Hot water flows in the beverage substance cartridge 1 and hot water is exported after substance in the cup is steeped and extracted. As the volume of the beverage substance cartridge 1 is limited, water filling and exporting are at the same time.

The substance in the embodiment is tea leaf. The steeping kinds of tea leaf are three kinds namely tea waking, pre-soaking and extracting, the water filling temperature is 44, the water filling speed 45 and steeping time 46 are set and adopted in every steeping process respectively.

When the steeping kind is tea waking, the heating section 341 heats water to 120° C. and maintains the temperature; the water filling section 342 fills water in the beverage substance cartridge 1 according to 1:120 (the break-make ratio of water pump) water filling speed; the steeping section 343 completes the tea waking process and the lasting time is 5 s;

When the steeping kind is presoaking, the heating section 341 reduces the temperature to 100° C. and maintains the temperature; the water filling section 342 fills water in the beverage substance cartridge 1 according to 7:16 (the break-make ratio of water pump) water filling speed; the steeping section 343 completes the presoaking process and the lasting time is 15 s;

When the steeping kind is extracting, the water filling temperature is 90° C., the water filling speed is the break-make ratio of the water pump, and the steeping time is 35 s. The heating section 341 reduces the temperature to 90° C. and maintains the temperature; the water filling section 342 fills water in the beverage substance cartridge 1 according to 12:7 (the break-make ratio of water pump) water filling speed; the steeping section 343 completes the presoaking process and the lasting time is 35 s.

The water exporting section 35 exports brewed beverage. The water exporting section 35 includes the supporting platform 24 and a water outlet (not shown in the figure), and brewed beverage flows out of the water outlet. The supporting platform 24 is a hollow structure, the upper surface of the supporting platform has some long and thin grids, and water overflowing from the cup flows into the cavity in the supporting platform 24 for clearing.

The controlling section 36 is used to send commands to the identifying apparatus 32, the water supplying section 33, the brewing apparatus 34 and the water supplying section 35. The controlling section 36 has collaboration with the inputting and displaying section 38 to control the displayed content and operating options of the beverage producing equipment 2.

The beverage substance cartridge collecting section 37 is used to collect used beverage substance cartridges 1. The beverage substance cartridge collecting section 37 includes a used cup bucket. The supporting platform 24 could be pushed in and pulled out and connected with a square used cup bucket at the rear. After the brewing process is finished, the mechanical device in the beverage producing equipment could invert the beverage substance cartridge putting section, discard used beverage substance cartridges into the used cup bucket for collecting. After the supporting platform 24 is pulled out, more than one used substance cartridges 1 could be dumped at a single time.

Figure 6:
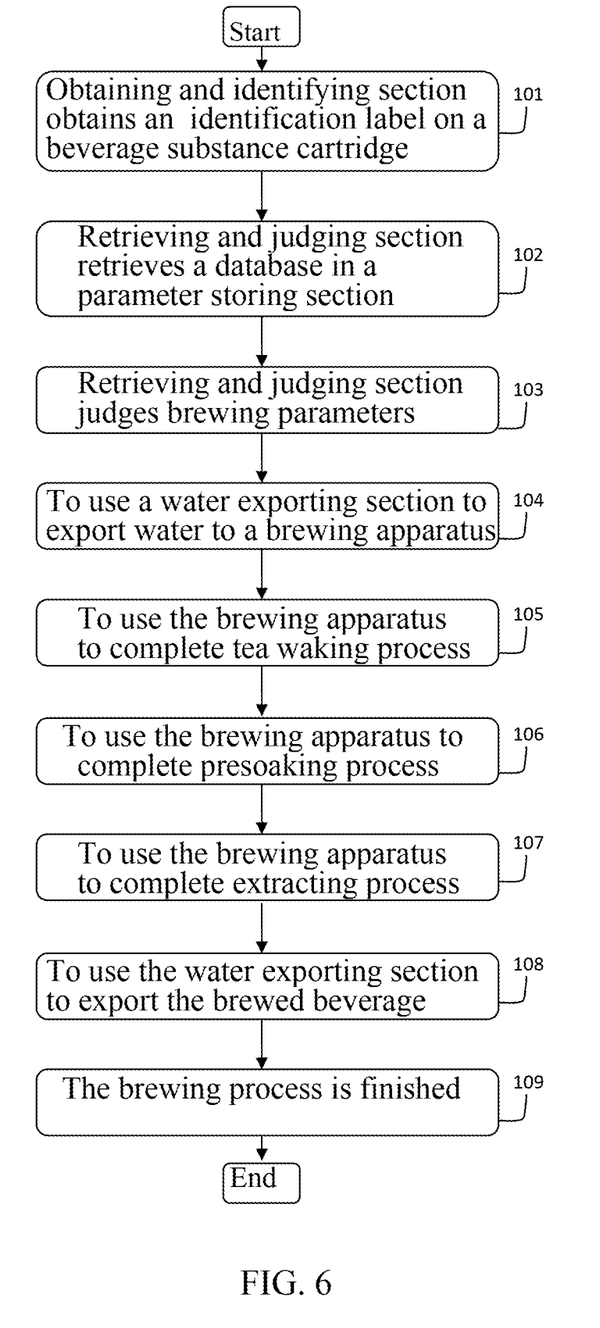
FIG. 6 is an action flowchart of a beverage producing equipment in embodiment 1.

As shown by FIG. 6, the action flow of the beverage producing equipment in the invention is as follows: The beverage substance cartridge 1 is put in the cavity 23 of the beverage substance cartridge putting section 31, command is input by using keypad 22 of the inputting and displaying section 38, then the controlling section 36 will send a command to the identifying apparatus 32 (In other embodiments, the beverage substance cartridge putting section 31 has an automatic detecting apparatus, the cover should be sealed after the beverage substance cartridge 1 is put in the cavity 23 of the beverage substance cartridge putting section 31, and then the beverage producing equipment brews beverage automatically without any commands), and after the identifying apparatus receives the command from the controlling section 36, the obtaining and identifying section 321 in the identifying apparatus 32 obtains the identification label 14 on the beverage substance cartridge 1 (step 101).

The identification label $A_2$ obtained by the obtaining and identifying section 321 is put in the cache of the obtaining and identifying section which saves the obtained identification label ($A_2$) for the comparison next (step 102).

The retrieving and judging section 323 compares the identification code ($A_2$) corresponding to the identification label 14 obtained by the obtaining and identifying section 321 with the data in the parameter storing section 322. When a certain identification code in the parameter storing section 322 is the same with the identification code ($A_2$) obtained by the obtaining and identifying section 321, the beverage substance is WuyiOolong Tea ($N_2$), and the brewing parameter corresponding to the identification code ($A_2$) is the brewing parameter of WuyiOolong Tea ($N_2$) in the beverage substance cartridge 1 (step 103).

The identifying apparatus 32 sends the brewing parameter judged by the retrieving and judging section 323 to the controlling section 36, the controlling section 36 sends commands to the water supplying section 33 and the brewing apparatus 34 according to brewing parameters, and the water supplying section 33 supplies water to the brewing apparatus 34 after receiving the command from the controlling section 36 (Step 104).

The heating section 341 in the brewing apparatus 34 heats water to 120° C. and maintains the water filling temperature at 120° C.; the water in the heating section 341 becomes water vapor, the water filling section 342 in the brewing apparatus 34 fills the water vapor from the heating section 341 into the steeping section 343 in the brewing apparatus and maintains the air inflow speed 1:120 which is the break-make ratio of the water pump, the steeping section 343 steeps WuyiOolong Tea 40 and completes the tea waking process, and the lasting time is 5 s (Step 105).

The heating section 341 in the brewing apparatus 34 reduces the water filling temperature to 100° C. and maintains the temperature at 100° C.; the water filling section 342 in the brewing apparatus 34 fills the hot water from the heating section 341 into the steeping section 343 in the brewing apparatus and maintains 7:16 water inflow speed, and the controlling section 36 controls time accurately to make sure the water filling for presoaking starts immediately when the tea waking step is finished; the steeping section 343 steeps WuyiOolong Tea 40 and completes the presoaking process, and the lasting time is 15 s (Step 106).

The heating section 341 in the brewing apparatus 34 reduces the water filling temperature to 90° C. and maintains the water filling temperature at 90° C.; the water filling section 342 in the brewing apparatus 34 fills the hot water from the heating section 341 continuously into the steeping section 343 in the brewing apparatus and maintains 12:7 water inflow speed, and the controlling section 36 controls time accurately to make sure the water filling for extracting starts immediately when presoaking step is finished; the steeping section 343 steeps WuyiOolong Tea 40, beverage is exported from the water exporting section 35 after the steeping process is finished, the presoaking process is finished, and the lasting time is 35 s (Step 107).

After the brewing process is finished, the controlling section 36 sends a command, and the beverage substance cartridge collecting section 37 receives the command and collects beverage substance cartridges (Step 108).

Embodiment 2

Figure 7:
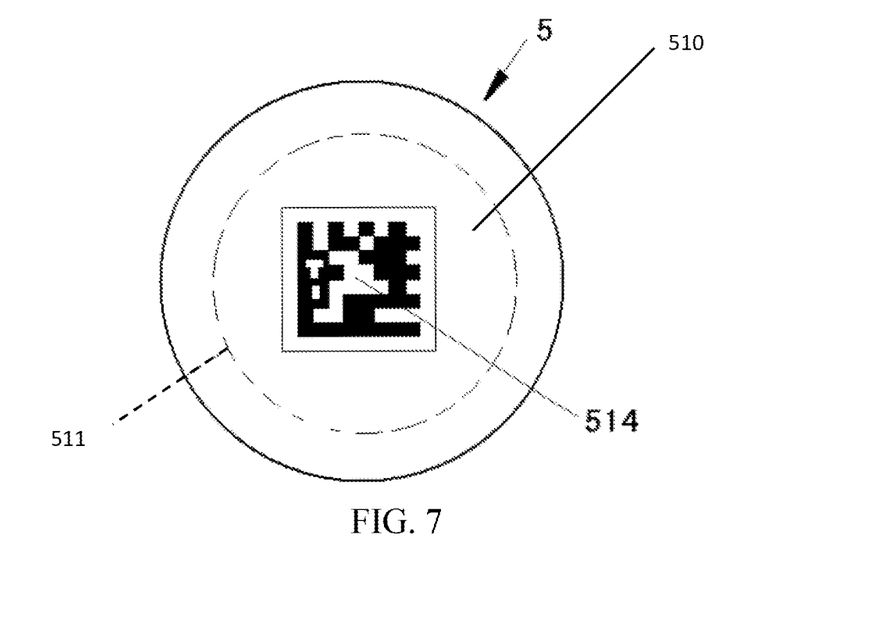
FIG. 7 is a structural block drawing of a beverage producing system in embodiment 2.

In embodiment 2, as shown by FIG. 7, description about a beverage producing system 3 is provided. In the description, some content the same with that in embodiment 1 will be omitted. The beverage producing system 3 includes a beverage substance cartridge 5 and a beverage producing equipment 4 to be used in conjunction.

As shown by FIG. 7, the beverage substance cartridge 5 includes a cartridge body 510 and a sealing cover 511.

The cartridge body 510 is used to accommodate the substance 40 for beverage production, and an identification label 514 is printed on the upper surface of the sealing cover 511.

Figure 8:
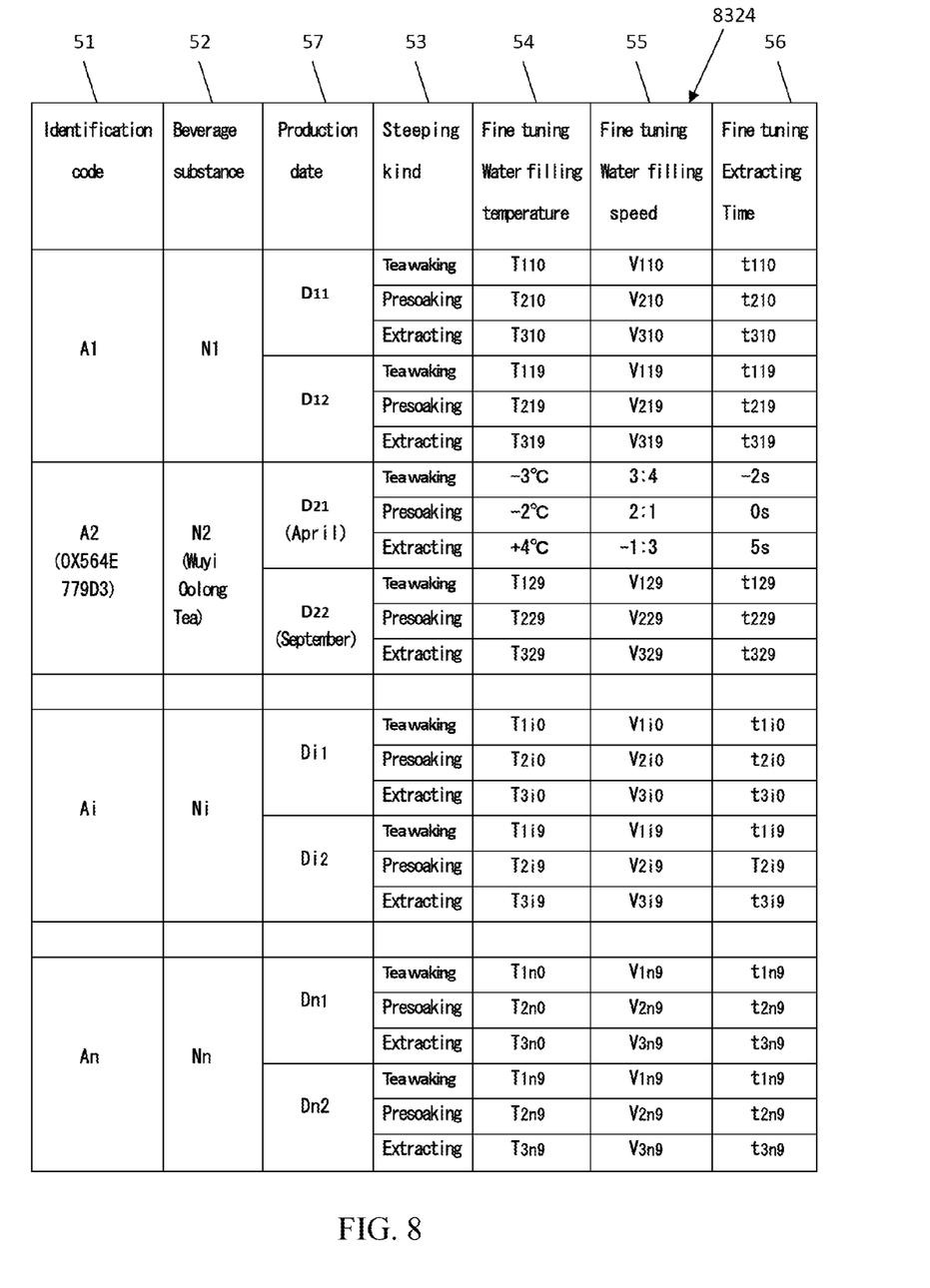
FIG. 8 is an explanation drawing showing structure of a fine-tuning parameter storing section in embodiment 2 of the invention.

The identification code corresponding to the identification code 514 indicates information about beverage substance 40 accommodated in the cartridge body 510, e.g. substance variety. The identification label includes the identification code and the beverage substance information used to indicate substance property, of which the beverage substance information used to indicate substance property includes beverage substance's place of origin, production date, etc. In FIG. 8, $D_{ij}$ (i=1, 2, 3, . . . , n, representing the sequence number; j=1, 2; representing spring and autumn respectively) is used to indicate the production date.

In the embodiment, the identification label includes the pattern identification code ($A_2$) and a production date ($D_{21}$), and in other embodiments, the identification label may be any one of the place of origin and production date, or both of the two.

As shown in FIG. 5 and FIG. 8, the beverage substance ($N_2$) corresponding to the pattern identification code ($A_2$) is WuyiOolong Tea, and the production date ($D_{21}$) is April.

As shown by FIG. 7, the beverage producing equipment 4 includes the beverage substance cartridge putting section 31, the inputting and displaying section 38, an identifying apparatus 832, the water supply section 33, the brewing apparatus 34, the water exporting section 35, a controlling section 836, the beverage substance cartridge collecting section 37, and a fine tuning parameter storing section 8324.

The identifying apparatus 832 is used to identify the substance in the beverage substance cartridge 5. The identifying apparatus 832 has the obtaining and identifying section 321, the parameter storing section 322, a fine tuning parameter storing section 8324 and a retrieving and judging section 8323.

The obtaining and identifying section 321 is used to obtain the identification label 514 on the beverage substance cartridge and identify the identification code ($A_2$) and the production date ($D_{21}$) corresponding to the identification label 14.

The obtaining and identifying section 321 has a cache (not shown in the figure) which is used to save the identification code ($A_2$) and the production date ($D_{21}$) for comparison next.

The identification label 514 is translated into hexadecimal 0X564E779D3 by the obtaining and identifying section 321, i.e. the identification code $A_2$, indicating WuyiOolong Tea ($N_2$) is put in the cartridge body 510.

The parameter storing section 322 is used to store brewing parameters. As shown by FIG. 5, brewing parameter data of different beverage substances is saved in a table in the parameter storing section 322, for example water filling temperatures, water filling speeds, steeping time, etc. of different tea leaves, also including the most appropriate water temperature, brewing time(s), brewing time, tea waking or not, etc.

The parameter storing section 322 has items including the identification label 41, the beverage substance 42, the steeping kind 43, the water filling temperature 44, the water filling speed 45, the steeping time 46, etc. Different data corresponding to different beverage substances is saved in the parameter storing section 322.

The substance in the embodiment is tea leaf, in the brewing process of tea leaves, the steeping kinds include three kinds namely tea waking, presoaking and extracting, and the water filling temperature, the water filling speed, and the steeping time are set and adopted in every steeping process respectively. Therefore the steeping kind has three items namely tea waking, presoaking and extracting. The tea waking, presoaking and extracting correspond to a group of parameters respectively. The group of parameters includes the water filling temperature $T_{ki}$, the water filling speed $V_{ki}$, the steeping time $t_{ki}$, etc. (wherein, K=1, 2, 3, indicating three processes namely tea waking, presoaking, extracting respectively; i=1, 2, 3 . . . , n, representing the sequence number of the identification code).

The fine tuning parameter storing section 8324 is used to store the substance information (such as production date and place of origin) to indicate the substance property and the fine tuning parameter corresponding to the substance information.

As shown by FIG. 8, the fine tuning parameter storing section 8324 stores the fine tuning brewing parameter data of different beverage substances on different production dates in a table, and the fine tuning parameter storing section 8324 has items like the identification code 51, a beverage substance 52, a steeping kind 53, a fine tuning water filling temperature 54, a fine tuning water filling speed 55, a fine tuning steeping time 56, a production date 57, etc.

The fine tuning parameter storing section 8324 stores the fine tuning parameters when the substance production date is April ($D_{21}$) (spring tea), i.e. a fine tuning water filling temperature $T_{kio}$, a fine tuning water filling speed $V_{kio}$, a fine tuning steeping time $t_{kio}$, (wherein k=1, 2, 3, representing the three steeping processes of tea waking, presoaking and extracting respectively; i=1, 2, . . . , n representing the substance sequence number in the parameter storing section).

The fine tuning parameter storing section also stores the fine tuning parameters when the substance production date is September ($D_{22}$) (autumn tea), i.e. a fine tuning water filling temperature $T_{ki9}$, a fine tuning water filling speed $V_{ki9}$, a fine tuning steeping time $t_{ki9}$, (wherein k=1, 2, 3, representing the three steeping processes of tea waking, presoaking and extracting respectively; i=1, 2, . . . , n representing the sequence number).

The fine tuning parameters $T_{kio}$, $V_{kio}$, $t_{kio}$, $T_{ki9}$, $V_{ki9}$ and $t_{ki9}$ could be positive or negative values and used to represent increase or decrease of parameters. Every substance corresponds to two different production dates (such as April and September), every production date corresponds to three steeping kinds, and every steeping kind corresponds to three fine tuning parameters.

In embodiment 2, the substance is WuyiOolong Tea ($N_2$), and the production date is April 2009 ($D_{21}$). The fine tuning parameters include the fine tuning water filling temperature $T_{kio}$, the fine tuning water filling speed $V_{kio}$ and the fine tuning steeping time $t_{kio}$. (wherein k=1, 2, 3, representing the three steeping processes of tea waking, presoaking and extracting respectively; i=1, 2, . . . , n representing the sequence number). The fine tuning parameters $T_{kio}$, $V_{kio}$, $t_{kio}$ may be positive or negative values which are used to represent increase or decrease of parameters.

As shown by FIG. 4, the retrieving and judging section 8323 retrieves the parameter storing section 322 according to the identification label 514 obtained by the obtaining and identifying section 321, and judges the brewing parameters corresponding to the identification label 514, i.e. the water filling temperature $T_{k2}$, the water filling speed $V_{k2}$ and the steeping time $t_{k2}$.

Further, according to the beverage substance information in the identification label like beverage substance production date (April), the retrieving and judging section 8323 compares with the data in the fine tuning parameter storing section 8324 and judges the fine tuning parameters, i.e. the fine tuning water filling temperature $T_{k20}$, the fine tuning water filling speed $V_{k20}$ and the fine tuning steeping time 420 (k=1, 2, 3).

The controlling section 836 adds the water filling temperature $T_{k2}$, the water filling speed $V_{k2}$ and the steeping time $t_{k2}$ in the brewing parameters judged by the retrieving and judging section 8323 to the fine tuning water filling temperature $T_{k2}$, the fine tuning water filling speed $V_{k2}$ and the fine tuning steeping time $t_{k2}$ in the fine tuning parameters respectively to get the new brewing parameters after fine tuning, i.e. the water filling temperature $T_{k21}$, the water filling speed $V_{k21}$ and the steeping time $t_{k21}$. (k=1, 2, 3). Wherein $T_{k21}=T_{k2}+T_{k20}$; $V_{k21}=V_{k2}+V_{k20}$; $t_{k21}=t_{k2}+t_{k20}$.

In embodiment 2, the identification label 514 is a pattern code and translated into hexadecimal 0X564E779D3 ($A_2$) by the obtaining and identifying section 321 which judges the substance 40 in the cartridge body 10 is WuyiOolong Tea ($N_2$) and the production date is spring tea. As shown in FIG. 8, the fine tuning parameters corresponding to the identification label 14 are also judged as follows:

When the steeping kind is tea waking, the fine tuning water filling temperature is −3° C., the fine tuning water filling speed is 3:4, and the fine tuning steeping time is −2 s;

When the steeping kind is presoaking, the fine tuning water filling temperature is −2° C., the fine tuning water filling speed is 2:1, and the fine tuning steeping time is 0 s;

When the steeping kind is extracting, the fine tuning water filling temperature is +4° C., the fine tuning water filling speed is −1:3, and the fine tuning steeping time is 5 s.

Actual brewing parameters judged by the embodiment are as follows:

When the steeping kind is tea waking, the water filling temperature is $T_{121}$=120° C.−3° C.=117° C., the water filling speed is $V_{121}$=1:120+3:4=4:124=1:31 (the break-make ratio of the water pump), and the steeping time $t_{121}$=5 s−2 s=3 s;

When the steeping kind is presoaking, the water filling temperature is $T_{221}$=100° C.−2° C.=98° C., the water filling speed is $V_{221}$=7:16+2:1=9:17 (the break-make ratio of the water pump), and the steeping time $t_{221}$=15 s+0=15 s;

When the steeping kind is extracting, the water filling temperature is $T_{321}$=90° C.+4° C.=94° C., the water filling speed is $V_{321}$=12:7−1:3=11:4 (the break-make ratio of the water pump), and the steeping time $t_{321}$=35 s+5 s=40 s.

The brewing apparatus brews the substance 40 and then forms beverage. The brewing apparatus 34 has the heating section 341, the water filling section 342 and the steeping section 343.

The heating section 341 heats water according to the water filling temperature $T_{k21}$ after fine tuning; the water filling section 342 fills water to the beverage substance cartridge 1 according to the water filling speed $V_{k21}$ after fine tuning; the steeping section 343 completes the juice steeping of the substance 40 according to the steeping time $t_{k21}$ after fine tuning (k=1, 2, 3, representing three processes namely tea waking, presoaking and extracting respectively).

Figure 9:
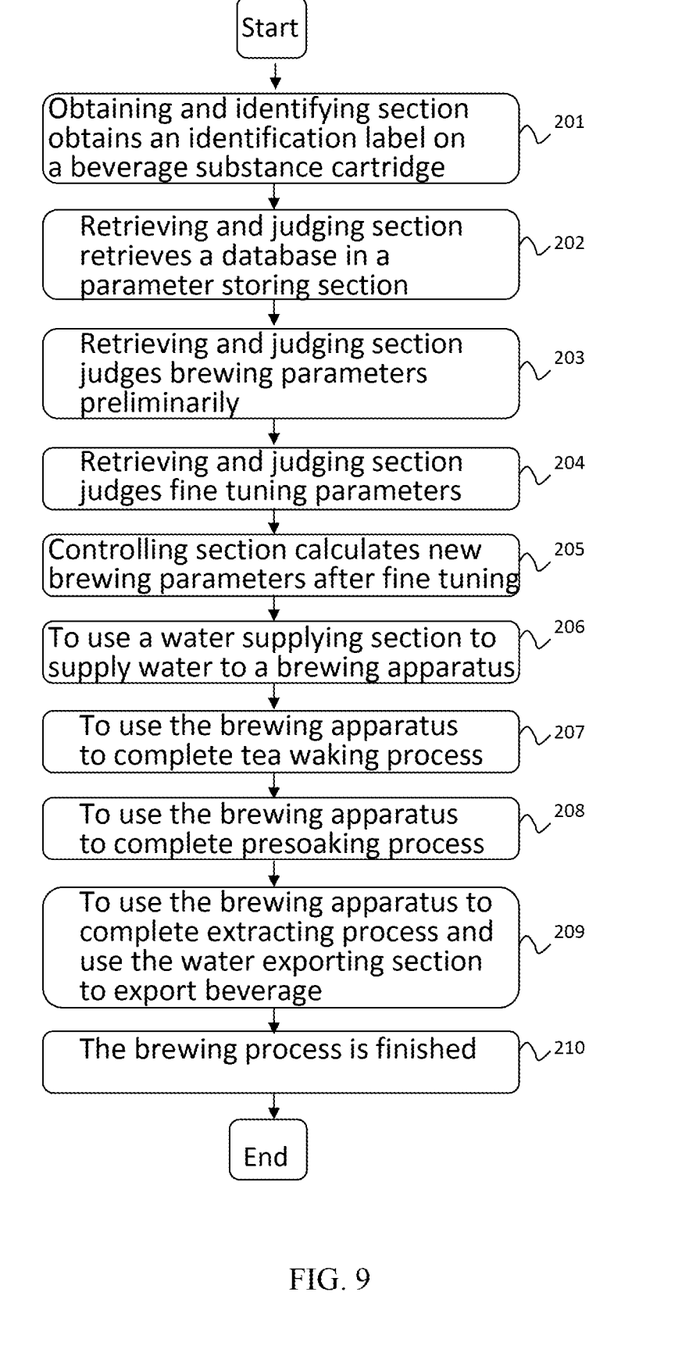
FIG. 9 is an action flowchart of a beverage producing equipment in embodiment 2 of the invention.

As shown by FIG. 9, in the embodiment, the action flow of the beverage producing equipment is as follows:

The beverage substance cartridge 5 is put in the cavity 23 of the beverage substance cartridge putting section 31, the command is input by using the keypad 22 of the inputting and displaying section 38, the controlling section 836 sends a command to the identifying apparatus 832, the obtaining and identifying section 321 in the identifying apparatus 832 obtains the identification label 514 on the beverage substance cartridge 1 (Step 201).

The identification code ($A_2$) and the production date ($D_{21}$) obtained by the obtaining and identifying section 321 is put in the cache in the obtaining and identifying section which saves the identification code ($A_2$) and the production date ($D_{21}$) obtained for the comparison next (Step 202).

The retrieving and judging section 8323 compares the identification code ($A_2$) obtained by the obtaining and identifying section 321 with the data in the parameter storing section 322. When a certain identification code in the parameter storing section 322 is the same with the identification code ($A_2$) obtained by the obtaining and identifying section 321, the beverage substance is WuyiOolong Tea ($N_2$), the brewing parameters corresponding to the identification code ($A_2$) are the brewing parameters of WuyiOolong Tea ($N_2$) in the beverage substance cartridge 5, i.e. the water filling temperature $T_{k2}$, the water filling speed $V_{k2}$ and the steeping time $t_{k2}$ (wherein k=1, 2, 3, representing three extracting processes namely tea waking, presoaking and extracting respectively) (Step 203).

The retrieving and judging section 8323 compares with the data in the fine tuning parameter storing section 8324 according to the production date ($D_{21}$), i.e. April 2009 in the identification label to judge the fine tuning parameters, i.e. the fine tuning water filling temperature $T_{k20}$, the fine tuning water filling speed $V_{k20}$ and the fine tuning steeping time $t_{k20}$ (Step 204).

The controlling section 836 adds the water filling temperature $T_{k2}$, the water filling speed $V_{k2}$ and the steeping time $t_{k2}$ in the brewing parameters to the fine tuning water filling temperature $T_{k2}$, the fine tuning water filling speed $V_{k2}$ and the fine tuning steeping time $t_{k2}$ in the fine tuning parameters respectively to get the new brewing parameters after fine tuning, i.e. the water filling temperature $T_{k21}$, the water filling speed $V_{k21}$ and the steeping time $t_{k21}$. (k=1, 2, 3). Wherein $T_{k21}=T_{k2}+T_{k20}$; $V_{k21}=V_{k2}+V_{k20}$; $t_{k21}=t_{k2}+t_{k20}$. (Step 205).

The identifying apparatus 832 sends the new brewing parameters to the controlling section 836, the controlling section 836 sends the command to the water supplying section 33 and the brewing apparatus 34 according to the new brewing parameters $T_{k21}$, $V_{k21}$ and $t_{k21}$, and after receiving the command from the controlling section 836, the water supplying section 33 supplies water to the brewing apparatus 34 (Step 206).

The heating section 341 in the brewing apparatus 34 heats water to 117° C. and maintains the water temperature at 117° C., the water in the heating section 341 becomes water vapor, the water filling section 342 in the brewing apparatus fills the water vapor in the heating section 341 to the steeping section 342 in the brewing apparatus and maintains the 1:31 air inflow speed, the steeping section 343 steeps WuyiOolong Tea leaf 40 and completes the tea waking process, and the lasting time is 3 s (Step 207).

The heating section 341 in the brewing apparatus 34 reduces the water filling temperature to 98° C. and maintains the temperature at 98° C.; the water filling section 342 in the brewing apparatus 34 fills the hot water from the heating section 341 into the steeping section 343 in the brewing apparatus 34 and maintains 9:17 water inflow speed, and the controlling section 836 controls time accurately to make sure the water filling for presoaking starts immediately when the tea waking step is finished; the steeping section 343 steeps WuyiOolong Tea 40 and completes the presoaking process, and the lasting time is 15 s (Step 208).

The heating section 341 in the brewing apparatus 34 reduces the water filling temperature to 94° C. and maintains the temperature at 94° C.; the water filling section 342 in the brewing apparatus 34 fills the hot water from the heating section 341 into the steeping section 343 in the brewing apparatus 34 and maintains 11:4 water inflow speed, and the controlling section 836 controls time accurately to make sure the water filling for extracting starts immediately when the presoaking step is finished; the steeping section 343 steeps WuyiOolong Tea 40 and completes the extracting process, the lasting time is 40 s, and the beverage after extracting is exported from the water exporting section 35 (Step 209).

After the brewing process is finished, the controlling section 836 sends the command, and the beverage substance cartridge collecting section 37 receives the command and collects the beverage substance cartridge (Step 210).

<Modification 1>

Figure 10:
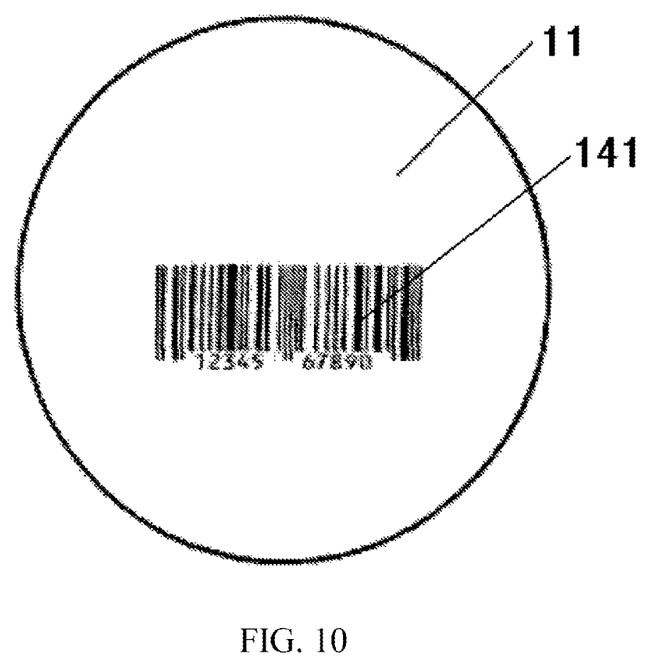
FIG. 10 is an illustration drawing of an identification label on a beverage substance cartridge in embodiment 1 according to modification of the invention.

As shown by FIG. 10, an identification label 141 is printed on the upper surface of the sealing cover 11 of the beverage substance cartridge 1, and the rest is completely the same with that in embodiment 1. The modification is one of modifications of embodiment 1. The identification label 141 is a bar code identification label. In this case, the bar code identifying unit used to identify the bar code in the obtaining and identifying section 31 is a bar code scanner.

<Modification 2>

Figure 11:
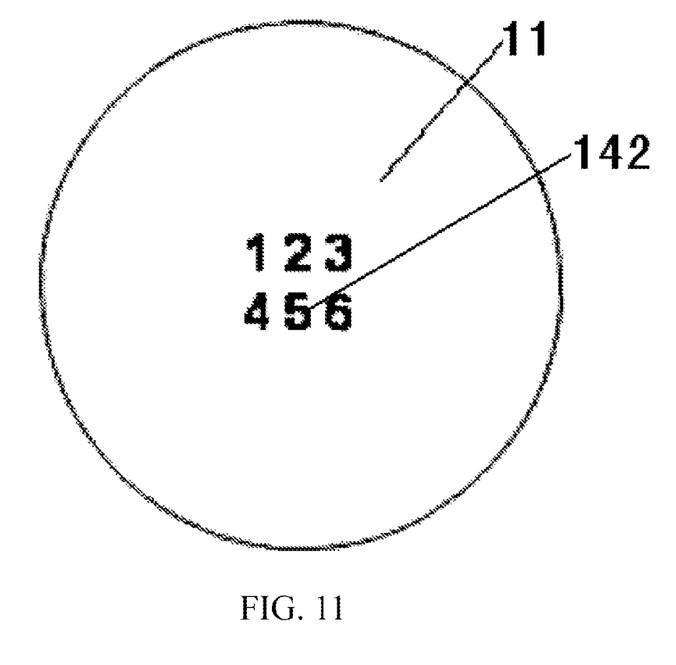
FIG. 11 is an illustration drawing of an identification label on a beverage substance cartridge in embodiment 2 according to modification of the invention.

As shown in FIG. 11, an identification label 142 is printed on the side wall of the beverage substance cartridge 1, and the rest is completely the same with that in embodiment 1. The modification is one of modifications of embodiment 1. The identification label 142 is a numeric code. In this case, the pattern identifying unit in the obtaining and identifying section 31 used to identify the numeric code is an image pick-up apparatus such as a camera.

Besides, the identification label 14 may be a radio frequency pattern code likewise, and the identifying tool is the radio frequency identifying unit in the obtaining and identifying section 321. Different identification codes may be used to save different amount of information. Different identification codes are selected according to different amount of information to be saved.

The substance may be any one of or a combination of at least two of tea leaf, dried vegetable, dried fruit and Chinese medicinal herb; or any one of or a combination of at least two of coffee, milk tea and tang. The beverage producing system described in the invention could be used to produce tea drinks, fruit and vegetable drinks, Chinese medicinal herb drinks for health care, beverage in need of brewing and extracting, etc., or to produce instant beverage such as coffee, milk tea and fruit juice. Besides, some tea or Chinese medicinal herbs may be brewed repeatedly for more than one time.

To sum up, the invention has the following advantages and positive effects:

The invention provides the beverage producing system and the beverage producing method, which could supply water automatically instead of manual work, identify information about beverage substance likewise, such as variety and years of tea leaf, and furthermore, take different brewing methods intelligently targeting at different beverage substances (e.g. tea leaf) according to identified information in collaboration with pre-stored tea brewing parameters to make sure every beverage substance could be brewed according to the perfect method, so the advantage of beverage substance will be given into full play. The beverage producing equipment which adopts the invention could yield brewing results accomplished by specialists but without manual work and professionals, and furthermore, the beverage producing equipment could be widely used in offices or homes.

What is claimed is:

1. A beverage producing apparatus for producing a beverage, using an identification label of a beverage substance cartridge, said identification label includes variety information of a substance corresponding to at least one brewing parameter for brewing the substance, and beverage substance information indicating a property of the substance corresponding to tuning brewing parameters for adjusting said at least one brewing parameter to obtain at least one new brewing parameter, the beverage producing apparatus comprising:

a beverage substance cartridge putting section configured to receive the beverage substance cartridge containing the substance;

a water supplying section configured to supply water for beverage production;

a brewing section configured to brew the substance in the beverage substance cartridge for beverage production;

a water exporting section configured to export the beverage produced by the brewing section; and an identifying apparatus configured to identify the substance contained in beverage substance cartridge, the identifying apparatus comprising:

an identifying section configured to identify said identification label on the beverage substance cartridge, and identify said variety information and said beverage substance information corresponding said identification label;

a parameter storing section configured to store said variety information and said at least one brewing parameter, corresponding to information on the identification label for brewing of the substance;

a tuning data storing section configured to store the beverage substance information and the tuning brewing parameters;

a retrieving and judging section configured to retrieve from the parameter storing section according to said variety information to determine a corresponding brewing parameter, and to retrieve from said tuning data storing section according to said beverage substance information to determine a corresponding tuning brewing parameters; and a controlling section configured to control a sum of said corresponding brewing parameter and said corresponding tuning brewing parameter to obtain a new brewing parameter.

2. The beverage producing equipment according to claim 1, wherein said controlling section is configured to send commands to the beverage substance cartridge putting section, the identifying apparatus, the brewing section and the water exporting section.

3. The beverage producing equipment according to claim 1, wherein the brewing section comprises:

a heating section configured to heat water supplied by a water supplying section;

a water filling section to fill the heated water in the beverage substance cartridge; and a steeping section configured to steep juice from the substance;

wherein said at least one brewing parameter comprises a water filling temperature, a water filling speed, and a steeping time; and wherein the heating section heats the water according to the water filling temperature, the water filling section fills the water according to the water filling speed; and the steeping section steeps juice according to the steeping time.

4. The beverage producing equipment according to claim 3, wherein the at least one brewing parameter corresponds to at least one of steeping parameters for tea waking, presoaking, and extracting processes, wherein the substance comprises steeping kinds of tea leaf, and wherein the filling temperature, the water filling speed and the steeping time are set and adopted in each the steeping parameter.

5. The beverage producing equipment according to claim 1, wherein the identification label further comprises beverage substance information comprising any one of a place of origin and a production date of the substance, or both the place of origin and the production date of the substance.

6. A beverage producing system, comprising:

the beverage producing apparatus according to claim 1; and a beverage substance cartridge comprising:

a cartridge body that accommodates the substance;

a sealing cover that seals the substance in the cartridge body, and an identification label coupled to the cartridge body, the identification label comprising an identification code that indicates the substance, at least one brewing parameter for the substance that includes at least one of a water filling temperature, a water filling speed and a steeping time, and at least one of a place of origin of the substance, and a production date of the substance, wherein the at least one brewing parameter corresponds to at least one of tea waking, presoaking, and extracting processes for brewing of the substance when the substance is accommodated in the cartridge body.

7. A beverage producing apparatus according to claim 6, wherein the substance comprises any one of tea, dried vegetable, dried fruit and medicinal herb, or a combination of at least two of tea, dried vegetable, dried fruit, and medicinal herb.

8. A method for producing a beverage using a beverage producing apparatus, the method comprising:

providing the beverage producing apparatus with an identifying apparatus and a water exporting section, the identifying apparatus comprising an obtaining and identifying section and a retrieving and judging section;

identifying a substance contained in a beverage substance cartridge with the identifying apparatus;

identifying an identification label positioned on the beverage substance cartridge, variety information and beverage substance information with the identifying section;

determining a brewing parameter and a tuning brewing parameter for the substance with the retrieving and judging section, according to the variety information and the beverage substance information provided by identified identification label;

controlling a sum of the brewing parameter and the tuning brewing parameter to obtain a new brewing parameter;

brewing the substance with water to produce the beverage, according to the new brewing parameter determined by the retrieving and judging section; and exporting the brewed beverage with the water exporting section.

9. The method of claim 8, further comprising providing the beverage producing apparatus with a beverage substance cartridge controlling section.

10. The method of claim 9, further comprising collecting a used beverage substance cartridge after the step of exporting the brewed beverage with the water exporting section.

* * * * *